United States Patent
Fodor et al.

(10) Patent No.: US 9,414,268 B2
(45) Date of Patent: Aug. 9, 2016

(54) USER EQUIPMENT AND A RADIO NETWORK NODE, AND METHODS THEREIN FOR DEVICE-TO-DEVICE COMMUNICATION

(75) Inventors: Gabor Fodor, Håsselby (SE); Muhammad Kazmi, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 185 days.

(21) Appl. No.: 14/351,163

(22) PCT Filed: Oct. 14, 2011

(86) PCT No.: PCT/SE2011/051230
§ 371 (c)(1),
(2), (4) Date: Apr. 11, 2014

(87) PCT Pub. No.: WO2013/055271
PCT Pub. Date: Apr. 18, 2013

(65) Prior Publication Data
US 2014/0274066 A1   Sep. 18, 2014

(51) Int. Cl.
*H04W 36/00* (2009.01)
*H04W 36/08* (2009.01)
*H04W 24/02* (2009.01)

(52) U.S. Cl.
CPC .......... *H04W 36/0022* (2013.01); *H04W 24/02* (2013.01); *H04W 36/08* (2013.01)

(58) Field of Classification Search
CPC ........................... H04W 4/005; H04W 76/043
USPC ........................... 455/436–440, 445, 453–454
See application file for complete search history.

(56) References Cited

U.S. PATENT DOCUMENTS

| | | | | |
|---|---|---|---|---|
| 6,931,249 | B2* | 8/2005 | Fors | H04W 36/0066 370/328 |
| 2007/0115884 | A1* | 5/2007 | Shang | H04W 36/30 370/331 |
| 2009/0016232 | A1* | 1/2009 | Kwon | H04W 76/023 370/252 |
| 2010/0009675 | A1 | 1/2010 | Wijting et al. | |
| 2010/0220687 | A1 | 9/2010 | Reznik et al. | |
| 2010/0261469 | A1* | 10/2010 | Ribeiro | H04W 99/00 455/423 |
| 2012/0238273 | A1* | 9/2012 | Lim | H04W 16/04 455/436 |
| 2013/0005377 | A1* | 1/2013 | Wang | H04W 72/0406 455/509 |
| 2013/0102314 | A1* | 4/2013 | Koskela | H04W 36/0072 455/436 |

FOREIGN PATENT DOCUMENTS

WO   WO 2011/109027   9/2011

OTHER PUBLICATIONS

International Search Report for International Application No. PCT/SE2011/051230, Jan. 28, 2013.

* cited by examiner

*Primary Examiner* — Dung Hong
(74) *Attorney, Agent, or Firm* — Baker Botts, LLP

(57) ABSTRACT

Embodiments relate to device-to-device (D2D) communications in a communications network (1), wherein the communications network (1) comprises a first user equipment (10), a first radio network node (14) serving the first user equipment (10), a second user equipment (12). and a D2D capable radio network node (18,18). The first user equipment (TO) is configured to recognize a second user equipment (12) to have a D2D communication with and to perform a cell change from the first radio network node (14) to the D2D capable radio network node (16,18), when the first radio network node (14) does not have D2D capability.

21 Claims, 8 Drawing Sheets

USER EQUIPMENT AND A RADIO NETWORK NODE, AND METHODS THEREIN FOR DEVICE-TO-DEVICE COMMUNICATION

PRIORITY

This nonprovisional application is a U.S. National Stage Filing under 35 U.S.C. §371 of International Patent Application Serial No. PCT/SE2011/051230, filed Oct. 14, 2011 and entitled "A User Equipment And A Radio Network Node, And Methods Therein For Device-to-Device Communication."

TECHNICAL FIELD

Embodiments herein relate to a user equipment and a radio network node, as well as to methods therein. In particular, embodiments herein relate to handling and enabling of device-to-device communication in a communications network.

BACKGROUND

Communication devices such as User Equipments (UE) are enabled to communicate wirelessly in a wireless communications system, sometimes also referred to as a cellular radio system or a cellular network. The communication may be performed e.g. between two user equipments, between a user equipment and a regular telephone and/or between a user equipment and a server via a Radio Access Network (RAN) and possibly one or more core networks, comprised within the wireless communications system.

User equipments are also known as e.g. mobile terminals, wireless terminals and/or mobile stations, and may further be referred to as mobile telephones, cellular telephones, or laptops with wireless capability, just to mention some further examples. The user equipments in the present context may be, for example, portable, pocket storable, hand-held, computer-comprised, or vehicle-mounted mobile devices, enabled to communicate voice and/or data, via the RAN, with another entity.

The wireless communications system covers a geographical area which is divided into cell areas, wherein each cell area, being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pica base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Group Special Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the context of this disclosure, the expression Downlink (DL) is used for the transmission path from the base station to the mobile station. The expression Uplink (UL) is used for the transmission path in the opposite direction i.e. from the mobile station to the base station.

When a user equipment is powered on, it starts the initial cell selection procedure. The purpose of the initial cell selection procedure is to ensure that the user equipment gets into service as fast as possible. The user equipment uses this procedure to scan all Radio Frequency (RF) channels in the E-UTRA bands according to its capabilities to find a suitable cell, where suitable refers to a combination of radio measurements based criteria, e.g. a Reference Signal Received Power (RSRP) and other criteria, e.g. the cell belonging to a Public Land Mobile Network (PLMN) that the user equipment is allowed to camp on.

Once the user equipment camps on a suitable cell, it continuously searches for the best cell to camp on. This procedure is called cell reselection. Its purpose is to ensure that the user equipment always camps on the cell that is best in terms of some predetermined set of criteria celled the cell ranking criteria. Broadly speaking, cell reselection is the basic idle mode mobility procedure that ensures that the user equipment continuously may receive system broadcast information and continuously may be paged within the coverage area of its RUM. Cell reselection also ensures that once paged, the user equipment will enter connected mode in a cell that provides good coverage.

Handover refers to the transfer of an ongoing call or data session from one channel connected to a core network to another channel.

Cell change may be used to describe the mobility when the user equipment performs inter-radio access technology (inter-RAT) handovers, e.g. between a GERAN and a WCDMA network. In some networks, such an inter-RAT cell change is supported by sending system information of the new network while still connected to the old network and thereby facilitating the inter-RAT mobility procedure. Cell change may also refer to the collection of idle and connected mode mobility, such as cell (re-)selection and handover procedures, but it may also include the cases of inter-RAT and inter-frequency mobility.

In network assisted device-to-device (D2D) communications underlaying a cellular infrastructure, user equipments in the proximity of each other may establish a direct radio link, also referred to as a device-to-device link or bearer. In this description, the expression device-to-device will be referred to as D2D. Network assisted D2D communications is sometimes also referred to as network D2D communications underlaying a cellular radio access network, or for short D2D as a RAN underlay.

FIG. 1 schematically illustrates a network assisted D2D communications scenario in a RAN according to prior art. A user equipment A, UE-A, is connected to a first network node, e.g. a serving base station eNB-A, and a user equipment B, UE-B, is connected to a second network node, e.g. a serving base station eNB-B. The RAN comprises in this example the user equipments A, B; and the first and second network nodes, eNB-A, eNB-B. Further, the user equipment A and the user equipment B are in the proximity of each other. In such a case, the RAN may assist the user equipments A, and B to establish a D2D link over which the user equipments A, and B can communicate.

When used in this description, by user equipments in the proximity of each other is meant user equipments that are positioning within a distance of 100-150 m from each other. However, devices communicating in licensed spectrum bands, and consequently allowed to transmit with higher power levels, such as 24 dBm, may, under certain propagation conditions, be able to discover and transfer data to each other over larger distances, e.g. over distances up to 1000 m.

While the user equipments A, and B communicate over the D2D link, they also maintain a cellular connection with their respective serving base station eNB-A, eNB-B, cf. FIG. 1. That way the cellular RAN can assist the user equipments A, and B in allocating cellular resources for the D2D link, indicating a maximum power level to the transmitting user equipment and, in general protecting the D2D link from interference from cellular user equipments or base stations. The basic rationale for network assisted D2D communications is to allow short range direct communication between user equipments utilizing cellular spectrum.

Network assisted D2D communications requires that the RAN, and essentially a network node. i.e., a base station or a radio network controller, where applicable, comprised in the network, implements functionalities specifically for the purpose of supporting D2D peer discovery and D2D link establishment. Such functionality is expected to be introduced gradually in the network nodes, as the details and protocols of D2D communications mature and get standardized. For example, a new functionality specific to D2D communication is the function of mode selection The mode selection function decides whether the user equipments should communicate via the cellular infrastructure or using the direct D2D link. In general, the set of new functionalities are related to the management of interference between an D2D layer and a cellular layer, and also to manage the mobility, security and quality of service issues related to the coexistence of cellular and D2D links within the coverage area of the RAN.

A basic requirement for network nodes supporting D2D communications is that they should be able to coexist with legacy RAN nodes as the D2D functionality will be gradually introduced into the existing RAN infrastructure. By legacy RAN nodes, when used herein, is meant RAN nodes that do not support D2D communication. Likewise, legacy user equipments, i.e. user equipments not supporting D2D communication, are expected to coexist with D2D capable user equipments in radio access networks. Thus, in future RANs, network nodes and/or user equipments with or without D2D functionality are expected to be present.

FIG. 2 schematically illustrates a communications network comprising network nodes with or without D2D functionality, also referred to as a mixed communications network. The mixed communications network comprises a user equipment A, UE-A, and a D2D capable network node eNB-A to which the user equipment A is connected. The communications network further comprises a user equipment B, UE-B, and a legacy or limited D2D capable network node eNB-B to which the user equipment B, UE-B, is connected. In such a mixed communications network, D2D capable user equipments, such as user equipment A and user equipment B, in the proximity of each other cannot establish a D2D link in operator spectrum unless both user equipments A, B are connected to a D2D capable network node, such as the D2D capable network node eNB-A. By operator spectrum is meant a spectrum licensed by an operator. This forbids unauthorized access to radio resources unless permitted by operator owning the spectrum.

Thus, in a RAN that comprises heterogeneous network nodes in terms of their capabilities of supporting D2D communications, cf. FIG. 2, two D2D capable user equipments in the proximity of each other cannot establish a D2D link unless both network nodes are capable of supporting network assisted D2D communications or unless the two D2D capable user equipments are connected to the same network node capable of supporting network assisted D2D communications.

Assuming tight reuse deployments, the reason that the two D2D capable user equipments A and B in the proximity of each other cannot establish a D2D link unless both are served by an D2D capable network node is that D2D communications in the operator spectrum need to be managed such that it coexists with the user equipments A and B communicating with their respective serving network nodes, e.g., base stations. That is D2D communications in the operator spectrum need to be managed such that the D2D communications may coexist with traditional cellular user equipments communicating with their respective serving base stations in cellular mode. In other words, since the D2D layer, i.e. the underlay layer, and the cellular layer need to be managed across multiple network nodes, the management of the D2D communications and the cellular layer becomes a major problem in heterogeneous communications networks comprising both D2D capable network nodes and non-D2D capable network nodes.

When used in this description, by tight reuse deployments is meant that the frequency reuse factor between cells is close to one or equals to one. In other words, most or all of the frequency resources, such as OFDM subcarriers, are reused for communications in every cell of the cellular network. Some examples of systems with tight frequency reuse deployments are WCDMA, LTE, CDMA2000 etc.

This basic problem arises in different situations within the scenario of FIG. 2.

In the first situation, the user equipment A, UE-A, and the user equipment B, UE-B, discover the proximity of each other, but at least one of them, and maybe both, is currently not connected to, i.e. served by, a D2D capable network node, e.g., base station such as eNode B-A, eNB-A.

In the second situation, the user equipment A, UE-A, and the user equipment B UE-B, are currently connected to the same network node, e.g., base station such as eNode B-B, eNB-B, which is not D2D capable.

In the third situation, the user equipment A. UE-A, and the user equipment B, UE-B, are currently connected to the same network node, e.g., base station such as eNode B-A, eNB-A, that is D2D capable, but the user equipment A, UE-A, is about to hand over to a non D2D capable network node, e.g., base station such as eNode B-B, eNB-B.

US 2010/0261469 A1, US 2010/0009675 A1, and WO 2010/006650 A1, relate to D2D communications in general and suffer from the drawbacks with a mixed communications network described above.

SUMMARY

An object of embodiments herein is to provide a way of improving the performance in a communications network by allowing short range direct communication between user equipments.

According to a first aspect of embodiments herein, the object is achieved by a method in a first user equipment for handling device-to-device, D2D communications in a communications network. The communications network comprises a first user equipment, a first radio network node serving the first user equipment, a second user equipment, and a D2D capable radio network node. The first user equipment recognizes a second user equipment to have a D2D communication with; and performs a cell change from the first radio network node to the D2D capable radio network node, when the first radio network node does not have D2D capability.

According to a second aspect of embodiments herein, the object is achieved by a first user equipment for handling D2D communications in a communications network. The communications network comprises the first user equipment, a first radio network node serving the first user equipment, a second user equipment, and a D2D capable radio network node. The first user equipment comprises a recognizing circuit configured to recognize a second user equipment to have a D2D communication with; and a performing circuit configured to perform a cell change from the first radio network node to the D2D capable radio network node, when the first radio network node does not have D2D capability.

According to a third aspect of embodiments herein, the object is achieved by a method in a second radio network node for enabling D2D communications in a communications network. The communications network comprises a first user equipment served by a first radio network node, a second user equipment and a D2D capable radio network node. The second radio network node requests a cell change of the first user equipment to the D2D capable radio network node, when the first radio network node has no D2D capability.

According to a fourth aspect of embodiments herein, the object is achieved by a second radio network node for enabling D2D communications in a communications network. The communications network comprises a first user equipment served by a first radio network node, a second user equipment and a D2D capable radio network node. The second radio network node comprises a requesting circuit configured to request a cell change of the first user equipment to a D2D capable radio network node, when the first radio network node has no D2D capability.

Since a cell change from the first radio network node to the D2D capable radio network node is performed when the first radio network node does not have D2D capability, D2D communication is obtained in a mixed communications network comprising both non-D2D capable network nodes and D2D capable network nodes. This results in an improved performance in the communications network by allowing short range direct D2D communication between devices.

An advantage of embodiments herein is that D2D communications is enabled in a communications network comprising a mixture of legacy and D2D capable network nodes.

A further advantage of embodiments herein is that a gradual introduction of D2D capable network nodes into existing communication networks is provided.

A further advantage of embodiments herein is that the D2D communications may be maintained between devices even if prior to the start of the communication they are under the control of different network nodes with different capabilities.

A further advantage of embodiments herein is that the overall power consumption and interference will be reduced since D2D communication between closest pair of user equipments or between most feasible pair of user equipments in terms of required resources may be established by the virtue of cell change in case the user equipments initially are controlled by different network nodes with different capabilities.

BRIEF DESCRIPTION OF THE DRAWINGS

Embodiments will be described in more detail with reference to the following drawings, in which.

DETAILED DESCRIPTION

Embodiments will be exemplified in the following non-limiting description.

Figure 1:
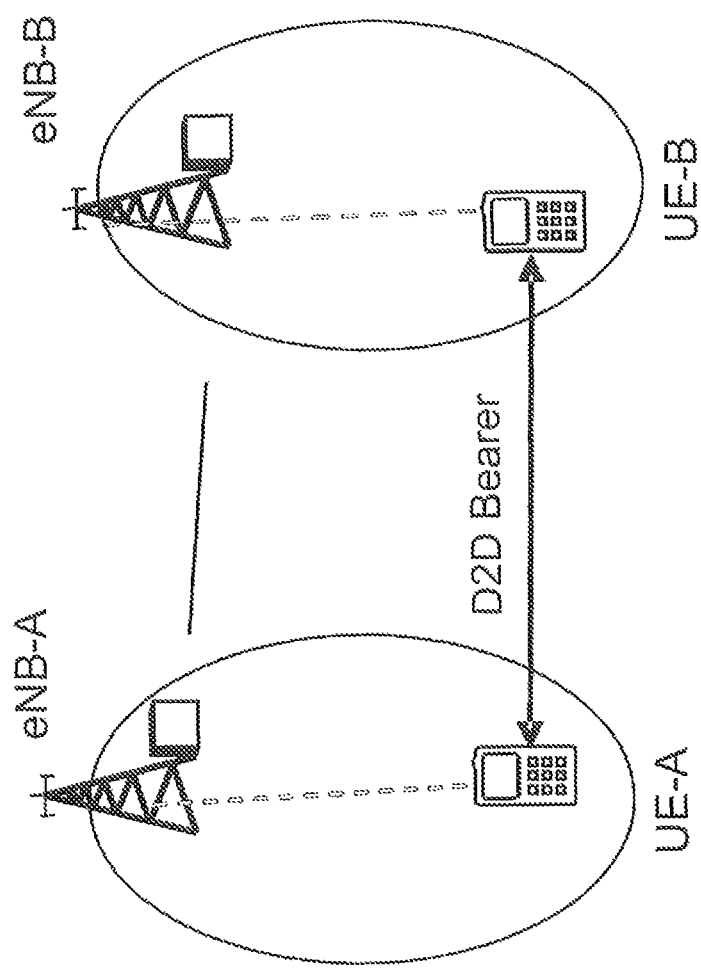
FIG. 1 is a schematic block diagram illustrating a prior art communications network.
Figure 2:
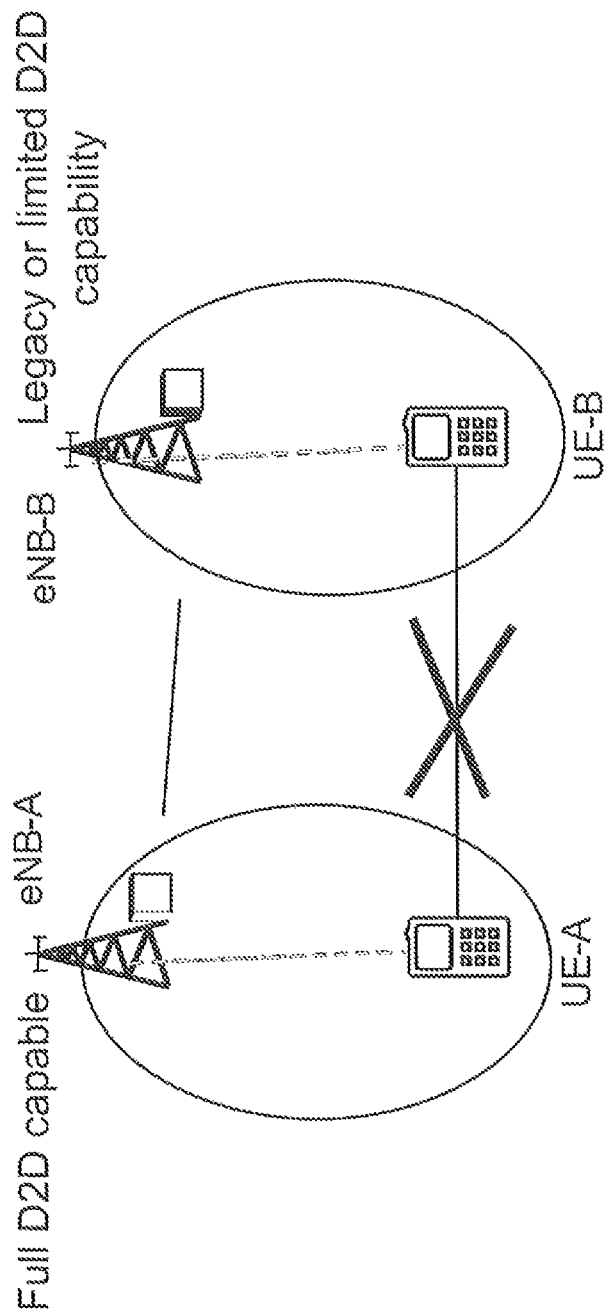
FIG. 2 is a schematic block diagram illustrating a prior art communications network.
Figure 3:
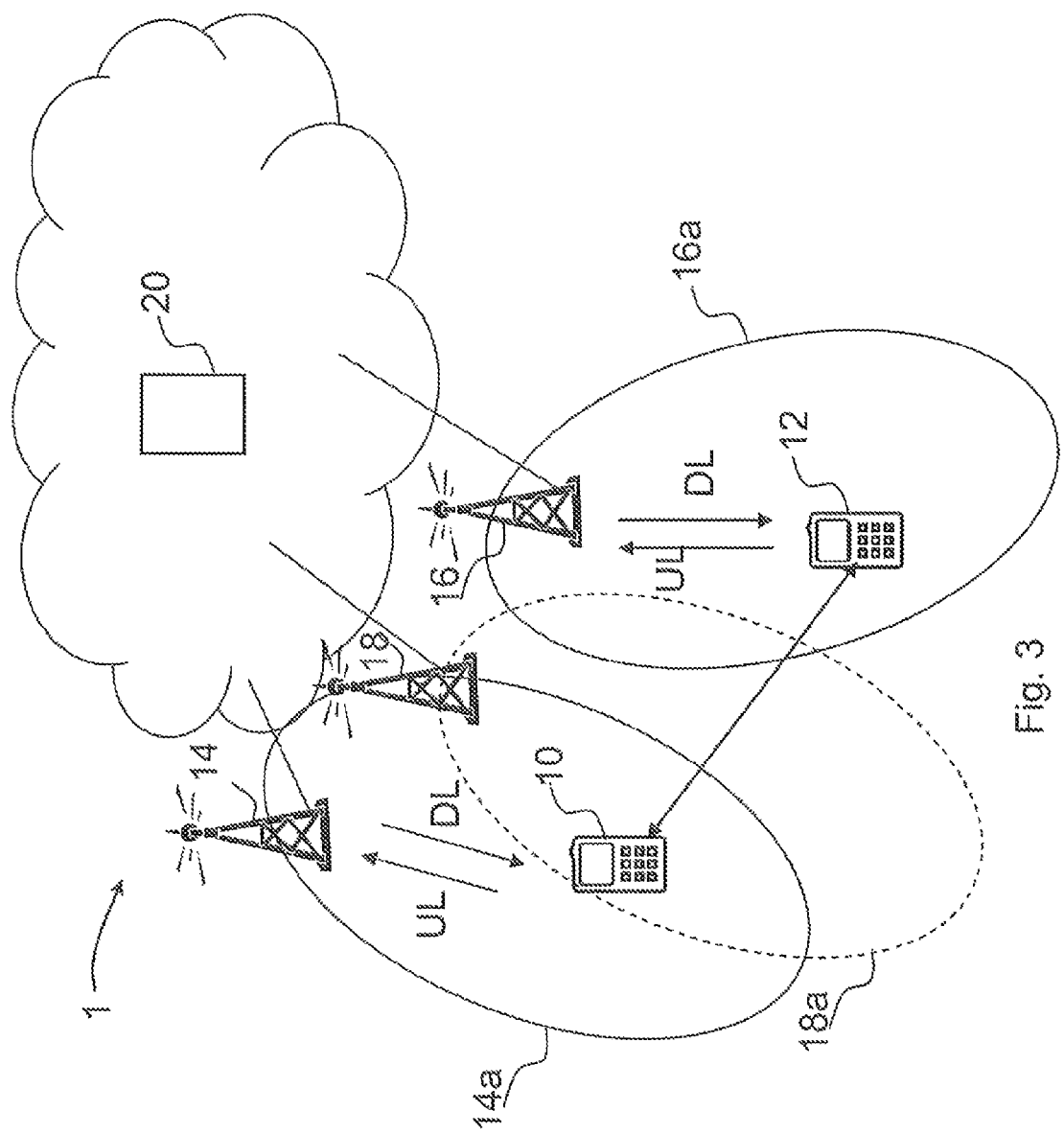
FIG. 3 is a schematic block diagram illustrating embodiments of a communications network.

FIG. 3 schematically illustrates a communications network 1 comprising a first user equipment 10, and a first radio network node 14 serving the first user equipment 10. The first radio network node 14 provides radio coverage over at least one geographic area forming a first cell 14a. The first user equipment 10 transmits data over a radio interface to the first radio network node 14 in an uplink (UL) transmission and the first radio network node 14 transmits data to the first user equipment 10 in a downlink (DL) transmission.

The communications network 1 comprises further a second user equipment 12 and at least one D2D capable radio network node 16,18. In the scenario in FIG. 3, two D2D capable network nodes 16 and 18 are shown. The at least one D2D capable radio network node 16,18 provides radio coverage over at least one geographic area forming a cell 16a,18a In the scenario in FIG. 3, a first D2D capable network node 16 provides radio coverage over a geographic area forming the cell 16a, and a second D2D capable network node 16 provides radio coverage over a geographic area forming the cell 18a The second user equipment 12 transmits data over a radio interface to at least one D2D capable radio network node 16,18 in an uplink (UL) transmission and the at least one D2D capable radio network node 16,18 transmits data to the second user equipment 12 in a downlink (DL) transmission.

In some embodiments, the at least one D2D capable radio network node 16,18 is a second network node 16 serving the second user equipment 12. In some other embodiments, the communications network 1 comprises the second network node 16 serving the second user equipment 12 and a third network node 18. The third network node 18 may be a neighbouring network node 18 that is located adjacent to the first network node 14 serving the first user equipment 10 and/or to the second network node 16 serving the second user equipment 12.

The first and second user equipments 10,12 may be e.g. a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. A number of other user equipments, not shown, may also be located within the respective cell 14*a*,16*a*,18*a*.

The radio network node 14,16,18 may be a base station such as an eNB, eNodeB, or a Home Node B, a Home erode B, a GSM/EDGE radio base station or any other network unit capable to serve a user equipment in a cellular communications network.

In some embodiments, the communications network comprises a central network node 20, such as e.g. an Operations Support System (OSS), a Self-Organizing Network (SON), a centralized node, a network controller, etc. The central network node 20 may be configured to inform each network node, e.g. each radio network node, 14,16,18, about its D2D capable neighbouring nodes and their respective associated cell identifiers. The central network node 20, e.g. the OSS, may inform each radio network node by using standardized interfaces, so called Operation and Maintenance O&M interfaces, and O&M messages to send information to the radio network node.

Embodiments described herein ensure that D2D capable user equipments 10, 12 that wish to establish a D2D link should be connected to a D2D capable network node 16,18.

In some embodiments, the D2D capable user equipments 10, 12 are provided with means to verify whether or not the respective serving network node 14,16 is D2D capable. Such verification means should be applicable m both a low activity state, such as an idle mode (also sometimes referred to as idle state), and a connected mode. It should be understood, that the embodiments for idle mode are applicable to any low activity mode.

Further, as part of a D2D discovery process, when a first user equipment 10 and a second user equipment 12 discover each other, they may also exchange information about the D2D capability of their respective serving network nodes 14,16.

Furthermore, the first user equipment 10 and/or the second user equipment 12 may perform a cell change, e.g. a handover, a connection re-establishment, a cell reselection, a connection release with redirection to another cell, a primary component carrier change or a primary cell change in a multi-carrier system, etc., to a D2D capable network node, if such a cell change is possible.

Some embodiments are applicable to cell change performed in different mobility scenarios. There are basically two kinds of mobility scenario.

The first mobility scenario is an idle state mobility or a low activity RRC state mobility, such as cell selection, cell reselection, etc. The cell selection, also referred to as initial cell selection, and cell reselection of the first mobility scenario are mainly user equipment autonomous functions without any direct intervention of the network until the change of serving cell has already been performed. The behaviour of the user equipment 10, 12 in these mobility scenarios may still be controlled by some broadcasted system parameters and performance requirements specification. Examples of low activity state mobility are Cell Paging CHannel (CELL_PCH) or UMTS Registration Area Paging CHannel (URA_PCH) or even Cell Forward Access CHannel (CELL_FACH) in UMTS.

The second mobility scenario is an RRC connected state mobility, also referred to as an active state, such as handover, RRC connection re-establishment, RRC connection release with redirection, etc. The connected state mobility, e.g. handover, of the second mobility scenario is controlled by the network. The network may control the connected state mobility by explicit user equipment specific commands and by performance requirements specification.

In both the low activity mode, such as the idle mode, and the connected mode the mobility decision are typically based on one or more downlink neighbouring cell measurements.

Figure 4:
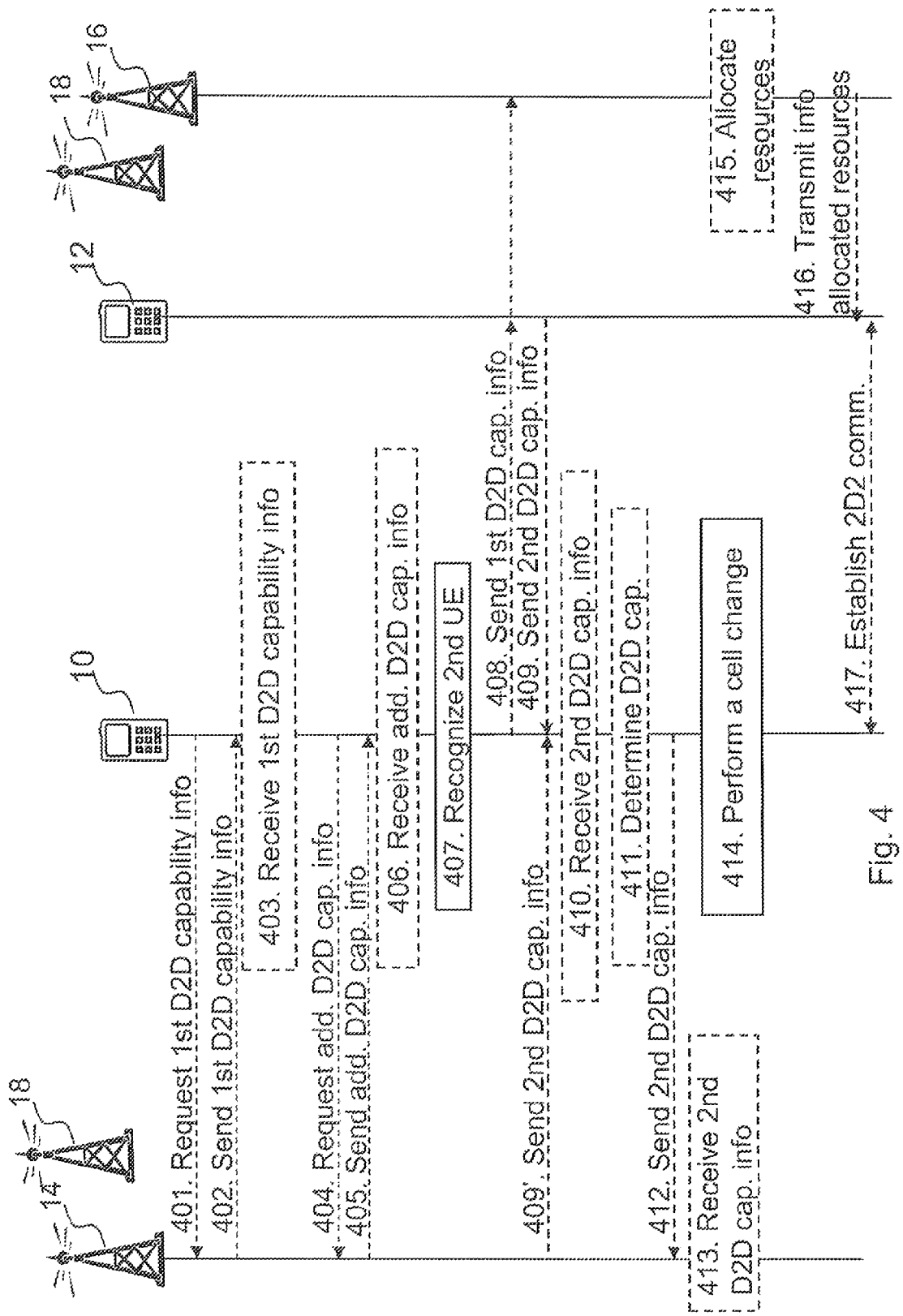
FIG. 4 is a schematic combined flowchart and signalling scheme of embodiments of a communications network.

FIG. 4 is a schematic combined flowchart and signalling scheme for handling D2D communications in a communications network 1. The communications network 1 comprises the first user equipment 10, a first radio network node 14 serving the first user equipment 10, a second user equipment 12, and a D2D capable radio network node 16,18.

In order to establish a D2D communication between two D2D capable user equipments 10,12, each D2D capable user equipment 10,12 should be served by a D2D capable network node 16,18. If one of the D2D capable user equipments 10,12 is not served by a D2D capable network node 16,18 that D2D capable user equipment 10,12 performs a cell change to a D2D capable network node 16,18. Thus, each D2D capable user equipment 10,12, needs information about the D2D capability of its serving network node 14,16 and needs to be able to perform a cell change to a D2D capable network node 16,18 if necessary before a D2D communication may be established.

In some embodiments, described herein, the first user equipment 10 is served by the first network node 14 that has no D2D capability and the second user equipment 12 is served by the D2D capable network node 16,18. Thus, in some embodiments described herein, the first user equipment 10 performs a cell change before a D2D communication is established between the first user equipment 10 and the second user equipment 12.

Actions for handling D2D communications in the communications network 1 will now be described with reference to FIG. 4. The actions do not have to be performed in the order stated below, but may be taken in any suitable order. Further, actions may be combined.

Action 401. The first user equipment 10 may request first D2D capability information from the first radio network node 14. The first D2D capability information relates to the D2D capability of the first network node 14, i.e. to whether or not the first network node 14 is capable of enabling D2D communication.

In some embodiments, a message is transmitted by the first user equipment 10 to the first radio network node 14. This may be referred to an D2D capability request message.

The message may be a RRC message; a Medium Access Control (MAC) message; or a Physical Layer Control (PLC) message.

For example, when the first user equipment 10 is in connected mode, the first user equipment 10 may acquire information about the D2D capability of the first network node 14 that is currently the serving network node for the first user equipment 10. The user equipment 10 may acquire the information via signalling means using an appropriate protocol, e.g. using an D2D capability information reply message, similarly to an D2D capability request which may be an RRC, MAC or PLC message, as described under actions 401 and 402 below.

In some embodiments, when in idle mode, the first user equipment 10 may acquire information about the D2D capability of the first network node 14 that the first user equipment 10 is currently camping on.

In some embodiments, the first network node 14 broadcasts its D2D capability in a broadcast message which the first user equipment 10 decodes. The broadcast message may be signalled in a Master Information Block (MIB) or System Information Block (SIB) message or combination thereof.

The first user equipment 10 may also identify the lack of an D2D capability of a network node by not receiving any D2D capability information within the broadcast time period. Alternatively, the first user equipment 10 may recognize a network node identity (ID) broadcasted by the network node 14 as an ID that identifies the network node as a non D2D capable network node.

Action 402. The first network node 14 that has received the request from the first user equipment 10 may send the first D2D capability information to the first user equipment 10.

In some embodiments, the first network node 14 responds to the user equipment's 10 D2D capability request message by including information elements in its D2D capability response message.

The response message may be a RRC response message; a MAC response message; or a PLC response message.

For a first user equipment 10 in idle mode the first network node 14 may broadcast its D2D capability information as part of the system information. For example, the D2D capability information may be broadcasted in the form of one (1) or two (2) bits as part of the system information. In some embodiments, the D2D capability information may be broadcasted in the MIB or in a suitable SIB of the system information. Alternatively, the D2D capability information may be broadcasted in a separate broadcast channel with low periodicity.

The serving network node, e.g. the first network node 14, may also proactively send its D2D capability information to the user equipment, e.g. the first user equipment 10, at for example initial setup or when the user equipment 10 enters the cell or changes state from idle mode to connected mode.

The serving network node, e.g. the first network node 14, may also signal the cell identifiers, e.g. Physical Cell Identifier (PCI) and/or Cell Global Identity (CGI), and other relevant information of one or more neighbouring network nodes 16,18 which are capable of supporting D2D communication. The neighbouring network node's D2D capability information may be signalled to the user equipment, e.g. the first user equipment 10, in idle mode, e.g. in a broadcast messages, or in connected mode, e.g. in a specific signalling message.

In order to signal the cell identifiers and possible other information, such as PCI, CGI, Base Station (BS) IP Address, Public Land Mobile Network Identity (PLMN ID) of one or more neighbouring network nodes 16,18 which are D2D capable, the first network node 14 acquires this information as will be described below.

According to some first alternative embodiments, the information is acquired by the first network node 14 from its peer network nodes, e.g. via communication between the first network node 14 and its peer network nodes using an X2 communication interface.

As previously mentioned, a central network node 20, such as e.g. an OSS, a SON, a centralized node, a network controller, etc. may inform each network node, e.g. each radio network node, about its D2D capable neighbouring nodes and their respective associated cell identifiers. The network node 20, e.g. the OSS, may inform each radio network node by using standardized interfaces, so called Operation and Maintenance O&M interfaces, and O&M messages to send information to the radio network node.

According to some other alternative embodiments, the first network node 14 requests one or more user equipments 10, 12 to read the system information of one or more neighbouring network nodes 16,18 to determine whether or not they are D2D capable and to report the acquired results, e.g. whether or not they are D2D capable, to the serving network node, e.g. the first network node 14.

Action 403. The first user equipment 10 may receive the first D2D capability information that is sent in action 402 from the first network node 14.

Action 404. The first user equipment 10 may request additional first D2D capability information from the first radio network node 14.

The additional first D2D capability information may relate to additional first D20 capability information of the first network node 14. Further, the additional first D2D capability information may comprise more detailed D2D capability information relating to the first network node 14, such as supported D2D related measurements, supported bands for D2D communications, RATS supporting D2D communication ((e.g. LTE FDD, LTE TDD or both), supported bandwidth for D2D communication, supported antenna modes for D2D communication, specific algorithm support, e.g. if the network node can make mode selection, power control and scheduling for the D2D link. Some of these capabilities may also be pre-defined and in which the radio network node may only indicate whether it supports such capability or not by sending limited information. For example, it may be pre-defined that the D2D capable radio network may support only 5 MHz and 10 MHz bandwidths for D2D communication. Further, it may be assumed that certain D2D capable radio network node, which is capable of 20 MHz bandwidth for normal communication, supports only 5 MHz for D2D communication. Hence the radio network node may signal binary '0' indicating that it supports 5 MHz assuming '0' and '1' corresponds to 5 MHz and 10 MHz D2D bandwidths respectively.

In some embodiments, the first user equipment 10 in connected mode may request the additional first D2D capability information from the first radio network node 14.

In some embodiments, a message comprising the additional first D2D capability information is transmitted by the first user equipment 10 to the first radio network node 14. This may be referred to as an additional D2D capability request message. The message may be an RRC message; a MAC message; or a PLC message.

Action 405. The first network node 14 that receives the request from the first user equipment ID may send the additional first D2D capability information to the first user equipment 10.

The first network node 14 may respond to the user equipment's 10 additional D2D capability request by including one or more information elements in its additional D2D capability response message.

The information element may be D2D power control capability and it may comprise No D2D capability or Limited D2D Capability or Full D2D Capability. In the No D2D capability case, the network node (e.g. eNode B) may not take part in D2D power control algorithms. In the Limited D2D Capability case, the network node (e.g. eNode B) may specify a maximum D2D transmit power, and in the Full D2D Capability case the network node (e.g. epode B) may set an exact D2D transmit power.

The meaning of the information element, e.g. the No D2D capability or Limited D2D Capability or Full D2D Capability, may also be pre-defined. In that case only an identifier may be signalled to the user equipment.

The response message may be an RRC response message; a MAC response message; or a PLC response message.

The additional D2D capability information may relate to additional D2D capability information of the first network node 14.

In some embodiments, the additional D2D capability information may relate to the D2D capability of a neighbouring network node 18 that is located adjacent to the first network node 14 or to a network node serving the second user equipment 12. Thus, the additional D2D capability information relates to whether or not the neighbouring network node 18 is capable of enabling and assisting D2D communication.

Action 406. The first user equipment 10 may receive the additional first D2D capability information that is sent from the first network node 14.

Action 407. The first user equipment 10 recognizes the second user equipment 12 to have a D2D communication with.

When establishing a D2D communication, peer discovery technologies, such as the master-slave matching procedure used by Bluetooth™ or the so called expression matching employed by the Flashlinq™ system, may be used. While adhoc technologies, such as Bluetooth™, have sophisticated peer discovery and detection mechanisms that do not require any support from infrastructure nodes, network assisted D2D peer discovery schemes may take advantage of the existence of a cellular infrastructure. For example, in network assisted D2D communications, the communications network, i.e. a network node comprised in the communications network, may provide information to the user equipments which frequency and time resources they should transmit beacon signals and scan for beacon signals. This helps the user equipments to find each other faster than in adhoc technologies.

In some embodiments of network assisted D2D communications, it may also be possible that the D2D capable user equipments 10,12 start communicating with each other in cellular mode. This means that they start to communicate with each other through the cellular infrastructure. If the user equipments 10, 12 are in the proximity of each other, e.g. they may be served by the same network node, e.g. by the D2D capable network node 16, and the communications network may use legacy techniques to identify the user equipments as candidates for D2D communication. Then the communications network may request the D2D user equipments to send beacon signal sand/or receive beacon signals to determine the D2D channel quality.

Peer discovery made by the user equipments 10,12 themselves will be described in more detail below under action 504. Peer discovery made by the communications network 1 will be described in more detail below under action 702.

Action 408. The first user equipment 10 may send the first D2D capability information (received in action 403) to the second user equipment 12.

In some embodiments, the second user equipment 12 sends the first D2D capability information to the second network node 16 serving the second user equipment 12.

Action 409. The second user equipment 12 may send a second D2D capability information to the first user equipment 10. The second D2D capability information relates to the D2D capability of a D2D capable radio network node 16,18 serving the second user equipment 12. By sending the second D2D capability information to the first user equipment 10, the first user equipment 10 will know that second user equipment 12 is served by the D2D capable network node 16,18.

Action 409'. As an alternative action to action 409, the first network node 14 may send the second D2D capability information to the first user equipment 10. As mentioned, the second D2D capability information relates to the D2D capability of the D2D capable radio network node 16,18 serving the second user equipment 12.

Action 410. The first user equipment 10 may receive the second D2D capability information relating to the D2D capable radio network node 16,18.

Action 411. The first user equipment 10 determines the D2D capability of the first radio network node 14 and of the D2D capable radio network node 16,18, respectively. That is, the first user equipment 10 determines whether or not the first radio network node 14 is D2D capable, and whether or not the radio network node 16,18 is D2D capable. For example, if the first radio network node 14 is not D2D capable, the first user equipment 10 may perform a cell change to a D2D capable network node 16,18, as described in action 414 below.

Action 412. If the first user equipment 10 received the second D2D capability information from the second user equipment 12, the first user equipment 10 may send the second D2D capability information to the first radio network node 14.

Action 413. The first radio network node 14 may receive the second D2D capability information from the first user equipment 10.

Action 414. The first user equipment 10 performs a cell change from the first radio network node 14 to the D2D capable radio network node 16,15, when the first radio network node 14 does not have D2D capability.

It should be understood that the cell change may be triggered by the user equipments detecting each other as candidates for a D2D communication. Alternatively or in addition, the cell change may be triggered by a network node detecting a user equipment as a candidate for a D2D communication with the user equipment, the network node is serving.

Action 415. The D2D capable radio network node 16,18 serving the second user equipment 12 may allocate resources for a D2D communication between the second user equipment 12 and the first user equipment 10.

Action 416. The D2D capable radio network node 16,18 serving the second user equipment 12 may transmit information about the allocated resources to the second user equipment 12 and to the first user equipment 10.

Action 417. A D2D communication is established between the first user equipment 10 and the second user equipment 12, when the second user equipment 12 is served by the D2D capable radio network node 16.

It should be understood that some actions may be combined to a single action. For example, action 403 may be combined with action 402 to a single action, action 410 may be combined with action 409 or action 409' to a single action, and action 413 may be combined with action 412 to a single action.

Figure 5:
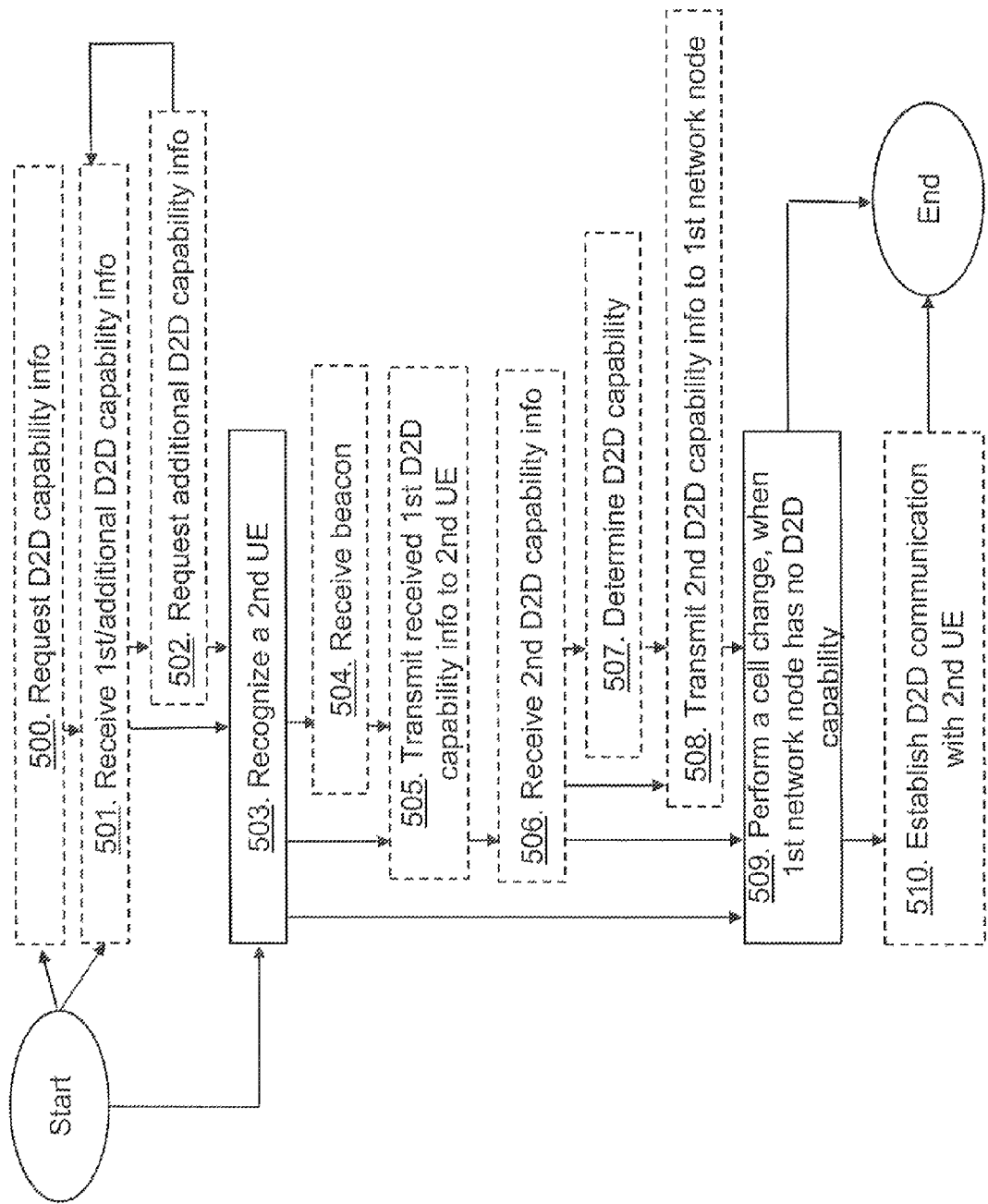
FIG. 5 is a flowchart depicting embodiments of a method in a first user equipment.

FIG. 5 is a schematic flowchart of embodiments of a method hi a first user equipment 10 for handling D2D communications in the communications network 1. As previously mentioned, the communications network 1 comprises the first user equipment 10, the first radio network node 14 serving the first user equipment 10, the second user equipment 12, and the D2D capable radio network node 16,18. The actions do not have to be performed in the order stated below, but may be taken in any suitable order. Further, actions may be combined.

Action 500. The first user equipment 10 may request first D2D capability information from a first radio network node 14 serving the first user equipment 10.

This may be performed by transmitting a message to the first radio network node 14. This may be referred to as a D2D capability request message. The message may be a RRC message; a MAC message; or a PLC message.

The first D2D capability information relates to the D2D capability of the first network node 14, i.e. to whether or not the first network node 14 is capable of enabling D2D communication.

According to some embodiments, when in connected mode, the first user equipment 10 acquires information about the D2D capability of the first network node 14 that is currently the serving network node. This was described in more detail under action 401 above.

In some embodiments, when in idle mode, the first user equipment 10 may acquire information about the D2D capability of the first network node 14 that the first user equipment 10 is currently camping on. This was described in more detail under action 401 above.

Action 501. The first user equipment 10 may receive first D2D capability information from the first radio network node 14. The first D2D capability information relates to the D2D capability of the first radio network node 14 or to the D2D capability of a neighbouring radio network node 18.

The first user equipment 10 may further receive a response message comprising additional D2D capability information requested in action 502 below. The response message may be a RRC message; a MAC message; or a PLC message.

Action 502. The first user equipment 10 may request additional first D2D capability information from the first radio network node 14, which additional first D2D capability information may be received in action 501.

The first user equipment 10 may request the additional first D2D capability information from the first radio network node 14 by transmitting a request to the first radio network node 14.

The request may be transmitted in a message by the first user equipment 10 to the first radio network node 14. This may be referred to as an additional D2D capability request message.

The message may be a RRC message; a MAC message; or a PLC message.

Action 503. The first user equipment 10 recognizes a second user equipment 12 to have a D2D communication with. The second user equipment 12 is served by a D2D capable radio network node 16,18 having D2D communication capability.

Action 504. The first user equipment 10 may receive a beacon signal from the second user equipment 12, which beacon signal comprises the second D2D capability information.

By the term beacon signal, when used herein, is meant a continuous or periodic radio signal with limited information content which signal is sent on a specified radio frequency known to a receiving equipment.

The information may for example comprise the identification or location of the sending equipment or it may encode the identification of a service or service category that the sending equipment is able to provide.

According to some embodiments, beacon signals are exchanged between the user equipments. The beacon signal may further comprise information about the D20 capability of the currently serving network node of the respective user equipment.

In some embodiments, when the user equipment 10,12 broadcasts beacon signals, the user equipment 10,12 may include information about the D2D capability of the network node 14,16 currently serving the user equipment 10,12. This piece of information may be identical with the one (1) or two (2) bits broadcasted by the network node as described in action 402. Alternatively, this piece of information may be part of the D2D capability information that the user equipment 10,12 obtained from its serving network node 14,16.

By listening to the beacon signals transmitted by the first user equipment 10, the second user equipment 12 obtains information about the D2D capability of the first network node 14 serving the first user equipment 10. If the second user equipment 12 learns that the first network node 14 does not support D2D communications, it may notify the second network node 16 serving the second user equipment 12. Thus, the second network node 14 will have knowledge of the D2D capability of the first network node 14.

Action 505. The first user equipment 10 may transmit the first D2D capability information to the second user equipment 12.

Action 506. The first user equipment 10 may receive a second D2D capability information relating to the D2D capable radio network node 16,18. The second D2D capability information may be received from the second user equipment 12 or from the first radio network node 14.

The second D2D capability information may relate to a second network node 16 serving the second user equipment 12. Alternatively, the second D2D capability information may relate to the neighbouring radio network node 18, which neighbouring radio network node 18 is a neighbouring radio network node 18 to the first radio network node 14 and/or the D2D capable radio network node 16.

The first user equipment 10 may receive the first D2D capability information or the second D2D capability information by acquiring a message containing the D2D capability information, which message is received on a control channel. This relates to actions 501 and 506.

Alternatively or in addition, the first user equipment 10 may receive the first D2D capability information or the second D2D capability information by acquiring an indicator representing the D2D capability, which indicator is received on a control channel. This relates to actions 501 and 506.

Alternatively or in addition, the first user equipment 10 may receive the first D2D capability information or the second D2D capability information by acquiring a radio network node identifier, which identifier belongs to a pre-determined list of identifiers used for D2D capability radio network nodes. This relates to actions 501 and 506.

Action 507. The first user equipment 10 may determine the D2D capability of the first radio network node 14 and of the D2D capable radio network node 16,18, respectively. The D2D capability may be determined based on the D2D capability information received in action 501 and/or action 506.

Action 508. The first user equipment 10 may transmit the second D2D capability information to the first radio network node 14.

Action 609. The first user equipment 10 performs a cell change from the first radio network node 14 to the D2D capable radio network node 16,18, when the first radio network node 14 does not have D2D capability.

The first user equipment 10 may perform the cell change upon reception of a message from the first radio network node 14 serving the first user equipment 10, which message requests the first user equipment 10 to perform a cell change to the D2D capable radio network node 16,18. The message may be received in a transparent container from the D2D capable radio network node 16,18 via the first radio network node 14.

The first user equipment 10 may autonomously perform the cell change from the first radio network node 14 to the D2D capable radio network node 16,18.

In some embodiments, when the first user equipment 14 learns about a D2D capable radio network node 16,18 from one or more broadcast messages, it may trigger the autonomous cell change.

The first user equipment 14 may also maintain a table comprising <Cell ID, D2D Capability> pairs so that the first user equipment 14 may know from the cell ID whether the network node associated with that cell is D2D capable or not. The mapping between the cell ID and the D2D capability is either signalled by the network or there may be a pre-defined mapping between the cell ID and the D2D capability. In case of the signalled table, the first user equipment 14 may update this table whenever in active mode in that cell or when it receives D2D information from broadcast messages when in idle mode.

The cell change may be a handover, a connection re-establishment, a cell reselection, a connection release with redirection to another cell, a primary component carrier change, a primary cell change in a multi-carrier system, or a primary or serving radio link change in a multipoint transmission and/or in a reception communication system.

By the term handover, when used herein, is meant a transfer of an ongoing call or data session from one channel connected to a core network to another channel. By handover is further meant the basic mobility procedure when the user equipment is in connected mode and a Radio Resource Control (ARC) connection exists between the user equipment and the communications network. The handovers are based on user equipment measurements continuously reported to the communications network. A user equipment measurement based handover procedure is designed so that the user equipment is always connected to the cell providing the best coverage and so that changing the serving base station is done in a lossless (seamless) fashion while the user equipment is moving within the coverage area of the PLMN.

By the term connection re-establishment, when used herein, is meant the procedure wherein a user equipment reestablishes a connection to a new cell in response to; a radio link failure of the serving radio link, a handover failure, and/or a radio link control (RLC) unrecoverable error. The new cell may be a strongest cell, i.e. a cell having the strongest radio coverage and/or radio link as compared to radio coverage and/or radio link of another cell or other cells.

By the term cell reselection, when used herein, is meant the user equipment mobility procedure in RRC IDLE (or in short: idle) mode, wherein the user equipment continuously selects the cell on which it camps, that is from which it receives system broadcast information and paging. The cell reselection procedure may take into account priorities associated with carrier frequencies and the prevailing radio conditions, like signal strength.

Some cellular technologies, such as LTE provides for a user equipment to redirect to another frequency or RAT upon connection release, which is referred to as connection release with redirection to another cell. This other frequency or RAT may be used by the user equipment to use for camping when entering the idle state after the connection release. The redirection of the UE to another cell (i.e. frequency) or RAT takes into account the user equipment capabilities and possibly also the user preferences.

When using carrier aggregation, the user equipment is associated with one (main) component carrier, called the primary component carrier and a corresponding primary serving cell from which the user equipment 10 receives non access stratum mobility information and maintains security association with. When the user equipment 10 changes this primary cell and corresponding primary component carrier, it is referred to as a primary component carrier change or a primary cell change. This may also be referred to as a primary cell change in a multi-carrier system.

By the term a primary or serving radio link change in multipoint transmission and/or in a reception communication system, when used herein, is meant the changing of the cell that is acting as the serving cell while the user equipment is engaged in coordinated multipoint (CoMP) transmission and/or reception. That is, for example, when the user equipment receives coordinated transmission from multiple cells, the user equipment is associated with one cell, called the serving cell, in terms of mobility state. When the user equipment changes this serving cell due to mobility or other reasons, it is referred to as the primary or serving radio cell (link) change.

It should be understood that the cell change may be triggered by the user equipments 10, 12 detecting each other as candidates for a D2D communication. Alternatively or in addition, the cell change may be triggered by a network node 14,16,18 detecting a user equipment 10,12 as a candidate for a D2D communication with the user equipment 10,12 the network node 14,16,18 is serving.

By the term primary or serving radio link change, when used herein, is meant the change of the serving radio link belonging to the multipoint transmission and/or reception communication system. This is sometimes also referred to as coordinated multipoint transmission and reception (CoMP), Distributed Antenna Systems (DAS), Radio Remote Head (RRH), Radio Remote Unit (RRU) etc. In multipoint system the user equipment receives from and/or transmits data towards more than one links operating from cells which may or may not be collocated on the same geographical site. The cells may operate on the same or different carriers. The carriers may belong to the same frequency band or to different frequency bands. The multipoint transmission and/or reception communication system comprises of at least one primary and at least one secondary radio links. The primary link contains at least the basic control signalling for maintaining communication between the multipoint transmission and/or reception communication system and the user equipment.

In some embodiments, if the second network node 16 has learnt or determined that the first network node 14 is D2D capable, then the first and second network nodes 14,16 proceed using known techniques, such as D2D radio bearer setup, to establish a D2D link between the first user equipment 10 and the second user equipment 12, as will be described below with reference to action 510.

However, in some embodiments, when the second network node 16 has learnt or determined that the first network node 14 does not support D2D communications, then the second network node 16 initiates a procedure which enables handover of the first user equipment 10 to a D2D capable network node 16,18. Alternatively, the first user equipment 10 may autonomously initiate a cell change.

Thus, different alternatives as, described in examples below may exist.

In some embodiments of a first example, the second network node 16 requests the first network node 14 to execute a handover, or any suitable procedure such as an RRC connection release with redirection of the first user equipment 10, to a D2D capable network node 16,18 if the radio conditions make such a handover or redirection possible.

In some embodiments of a second example, the second network node 16 sends a message, e.g. en RRC encapsulated message, to the first user equipment 10 in a transparent container via its serving network node, i.e. via the first network node 14. The encapsulated message received by the first network node 14 is thus transparently forwarded to the first user equipment 10 by the first network node 14. The message requests the first user equipment 10 to perform an RRC connection re-establishment to a D2D capable network node 16,18, such as the second network node 16 or a D2D capable neighbouring network node 18. In response, the first user equipment 10 relinquishes the existing link with the serving network node 14 and attempts to perform a connection re-establishment to the D2D capable network node 16,18 if the radio conditions (based on state of the art measurements, e.g. reference signal received power (RSRP) and/or reference signal received quality (RSRQ)) are such that the connection reestablishment (with the available transmit power budget and fulfilling bit error rate (BER) requirements) is possible to that cell.

In some embodiments of a third example, the first user equipment 10 may autonomously initiate an RRC connection re-establishment to a D2D capable network node 16,18 in case its serving network node 14 is not D2D capable and in case the first user equipment 10 wants to establish a D2D communication link with the second user equipment 12. The first user equipment 10 autonomously performs the RRC connection re-establishment to the D2D capable network node 16,18 if the radio conditions of the D2D capable network node 16,18 are also within acceptable limit, e.g. within the acceptable RSRP measurement value, available transmit power budget and fulfilling bit error rate (BER) requirements.

It should be understood that D2D capability triggered RRC connection re-establishment described above may be pre-defined in the standard. For example, it may be standardized whether or not to use embodiments of the first, second and/or third example described above, and when to use such embodiment(s).

Further, in case of an RRC connection release with redirection, the user equipment 10 may provide a list of network nodes 16,18 supporting D2D communication to its serving network node 14. Hence, the serving network node 14 may indirectly select a suitable target network node 16,18 that is D2D capable and has acceptable radio conditions.

According to some embodiments, the D2D triggered cell change operation or procedure performed by the user equipment or by the network node or jointly by both may also take into account the radio conditions and/or system load in addition to the D2D capability of the network node. The radio conditions, and/or system load may be determined based on user equipment measurements and/or radio network node measurements, i.e. based on measurements performed by the user equipment and/or radio network node. At least the radio conditions of the target D2D capable radio network node may be used. However, the radio conditions of the target D2D capable radio network node as well as those of the serving radio network node may also be used when performing the cell change operation. The system load, e.g. transmit power etc, of the target D2D capable radio network node may also be used when performing the cell change operation.

In some embodiments, the action of performing a cell change from the first radio network node 14 to the D2D capable radio network node 16,18 further comprises taking into account at least one user equipment measurement performed by the user equipment performing the cell change, e.g. the first user equipment 10, on the D2D capable radio network node 16,18. In some embodiments, account may be taken of at least one user equipment measurement comparing the first radio network node 14 and the D2D capable radio network node 16,18.

The user equipment measurement may comprise a RSRP; a RSRQ; or a carrier Received Signal Strength Indicator, RSSI.

In some embodiments, the action of performing a cell change from the first radio network node 14 to the D2D capable radio network node 1618 further comprises taking into account at least one radio network measurement performed by the user equipment performing the cell change, e.g. the first user equipment 10, on the D2D capable radio network node 16,18 and/or taking into account a load indication from the D2D capable radio network node 16,18.

The radio network node measurement may comprise a base station transmit power, a UL and/or DL resource block usage, and/or a cell load and/or a cell load indicator. A cell load and/or a cell load indicator may comprise a hardware load, a transport network load, a radio resource load, an interference load, and/or a traffic load.

As previously described, in some embodiments, the user equipment or the network node performing the cell change may use one or more user equipment measurements, i.e. one or more measurements performed by the user equipment. The user equipment measurement may depict the radio condition of the target radio network node, i.e. the D2D capable radio network node, or depict the comparison between the radio condition of the target radio network node and the serving radio network node. Thus, the user equipment measurements may be absolute when measured on a serving or target cell or they may be relative when comparing the serving and target cells. Some examples of user equipment measurements are measurements of signal strength (e.g. RSRP in LTE) and signal quality (e.g. RSRQ in LTE).

The user equipment or the network node performing the cell change may take into account the radio network node measurements or cell load. Examples of network measurements are base station transmit power, UL and/or DL channel usage (e.g. UL and/or DL resource block usage) etc. Examples of cell load or cell load indicator are overload indicator, radio resource overload, hardware resource usage, transport channel resource usage indicator, traffic load, interference load etc.

When the first user equipment 10 is in idle mode and learns that the first network node 14 that it is currently camping on is not D2D capable and further learns that the second network node 16 that second user equipment 16 is camping on is D2D capable, the first user equipment 12 may try to execute a cell reselection to the second network node 16. The first user equipment 10 may even execute cell reselection to another D2D capable network node, such as a neighbouring network node 18. In this latter case, the first user equipment 10 may use the information about the D2D capability of other network nodes broadcasted by its currently served network node, i.e. by the first network node 14. The first user equipment 10 may also use existing radio measurements when selecting the target network node 16,18. By existing radio measurements is meant RSRP, RSRQ and carrier RSSI etc.

Action 510. The first user equipment 10 establishes a D2D communication between the first user equipment 10 and the second user equipment 12, when the second user equipment 12 is served by the D2D capable radio network node 1618.

Figure 6:
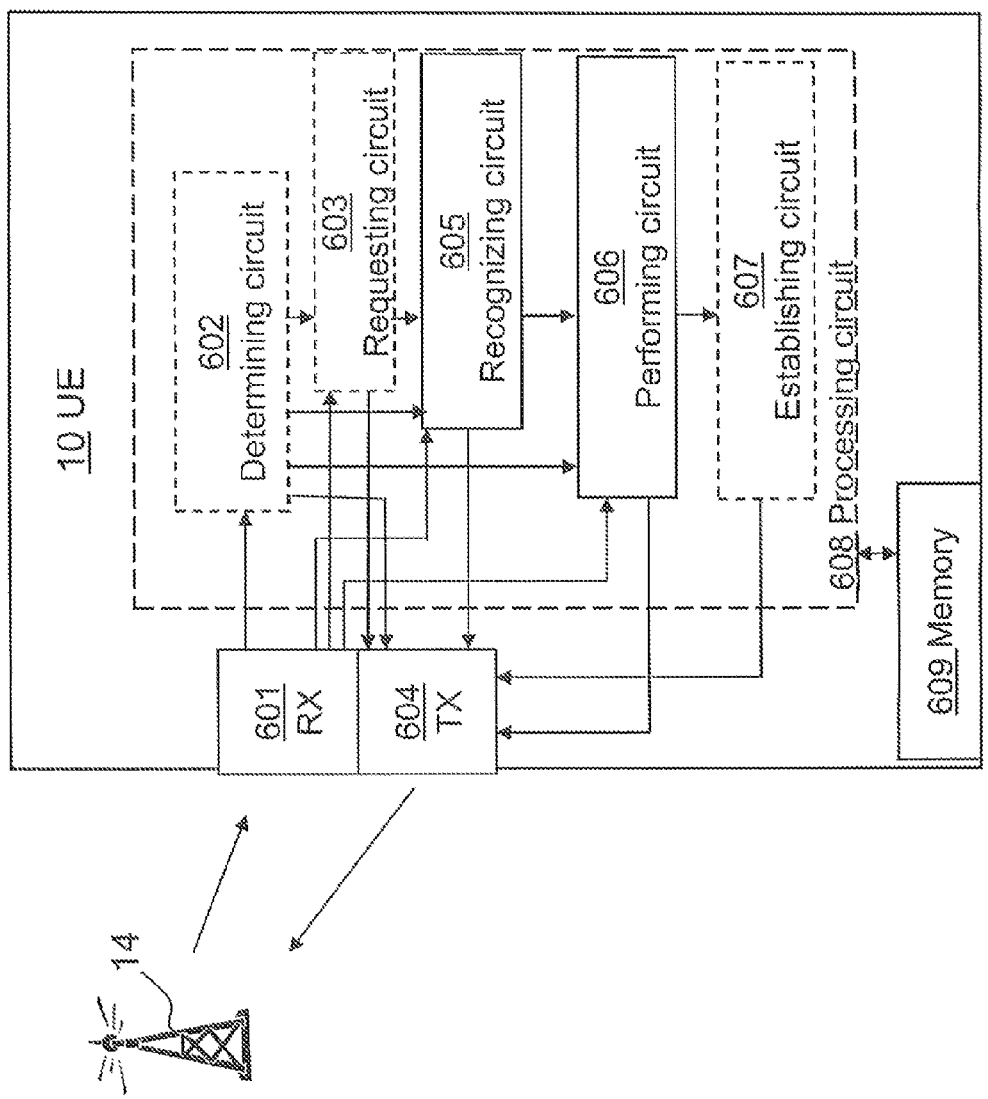
FIG. 6 is a flowchart depicting embodiments of a first user equipment.

To perform the method actions in the first user equipment 10 described above for handling D2D communications in the communications network 1, the first user equipment 10 comprises the following arrangement depicted in FIG. 6. As previously mentioned, the communications network 1 comprises the first user equipment 10, the first radio network node 14 serving the first user equipment 10, the second user equipment 12, and the D2D capable radio network node 16,18.

The first user equipment 10 comprises a recognizing circuit 605 configured to recognize the second user equipment 12 to have a D2D communication with.

The recognizing circuit 605 may be configured to receive a beacon signal from the second user equipment 12, which beacon signal may comprise the second D2D capability information relating to the second network node 16 serving the second user equipment 12.

In some embodiments, the recognizing circuit 605 is configured to receive the second D2D capability information from the first radio network node 14.

The first user equipment 10 comprises further a performing circuit 606 configured to perform a cell change from the first radio network node 14 to the D2D capable radio network node 16,18, when the first radio network node 14 does not have D2D capability.

The performing circuit 606 may be configured to receive a message from the first radio network node 14 serving the first user equipment 10. The message may request the first user equipment 10 to perform a cell change to the D2D capable radio network node 16,18.

The performing circuit 606 may be configured to autonomously perform a cell change from the first radio network node 14 to the D2D capable radio network node 16,18. In some embodiments, the performing circuit 606 is configured to perform the cell change autonomously when the first network node 14 has no D2D capability, when the first user equipment 10 has knowledge about the D2D capable network node 16,18, and when the radio condition is within acceptable limit, i.e. within the limit of the requirements, e.g. within acceptable RSRP measurement value, within the available transmit power budget and fulfilling BER requirements.

In some embodiments, the performing circuit 606 is configured to perform the cell change as a handover, a connection re-establishment, or a cell reselection, a primary component carrier change or a primary cell change in a multi-carrier system.

It should be understood that the cell change may be triggered by the user equipments detecting each other as candidates for a D2D communication. Alternatively or in addition, the cell change may be triggered by a network node detecting a user equipment as a candidate for a D2D communication with the user equipment the network node is serving.

In some embodiments, the first user equipment 10 further comprises a transmitting port 604 configured to transmit the first D2D capability information to the second user equipment 12 and/or to transmit the second D2D capability information to the first radio network node 14.

In some embodiments, the first user equipment 10 further comprises an establishing circuit 607 configured to establish a D2D communication between the first user equipment 10 and the second user equipment 12, when the second user equipment 12 is served by the D2D capable radio network node 16.

The first user equipment 10 may also comprise a receiving port 601 configured to receive a first D2D capability information from the first radio network node 14. The first D2D capability information relates to the D2D capability of the first radio network node 14. The receiving port 601 is further configured to receive a second D2D capability information relating to the D2D capable radio network node 16,18.

The receiving port 601 of the first user equipment 10 may be configured to acquire a message containing the D2D capability information, which message may be received on a control channel. The message may be acquired from the first network node 14.

Further, the receiving port 601 may be configured to acquire an indicator representing the D2D capability information, which indicator may be received on a control channel. The indicator sent by the first radio network node 14 to the first user equipment 10 may indicate the level or type of D2D capability of the first radio network node. For example, indicator 00 may indicate no D2D capability, 01 may indicate rudimentary D2D capability, including support for mode selection and power control for D2D communications, indicator 10 may indicate advanced D2D capabilities in own cell (e.g. scheduling and multiple antenna support) and indicator 11 may indicate multi-cell D2D capabilities that indicates that the capability of the network node to cooperate with other network nodes in the cellular network to manage interference and mobility for D2D communications.

Furthermore, the receiving port 601 of the first user equipment 10 may be configured to acquire a radio network node identifier, which identifier may belong to a pre-determined list of identifiers used for D2D capability radio network nodes.

An example of a radio network node identifier is the globally unique physical cell identifier of the cell associated with the radio network node or the IP address of the radio network node.

The predetermined list may be a table containing radio network node identifiers associated with a D2D capability description. Further, the predetermined list may be established by a centralised network node 20, e.g. the OSS, of the cellular network. Furthermore, the predetermined list may be established and maintained by a human engineer operating the OSS when configuring the cellular network and when installing a new radio network node in the cellular network and/or when upgrading existing network nodes in the cellular network.

It should be understood that the receiving port 601 and the transmitting port 604 may be arranged as a single receiving and transmitting circuit.

In some embodiments, the receiving port 601 is configured to receive the second D2D capability information from the second user equipment 12 or from the first radio network node 14.

The second D2D capability information may relate to a neighbouring radio network node 18, which neighbouring radio network, node 18 is a neighbouring radio network node to the network node 14,16 serving the first user equipment 10 and/or to the second user equipment 12. This means that the neighbouring radio network node 18 is a neighbouring radio network node to the first network node 14 and/or to the second network node 16.

In some embodiments, the user equipment 10 comprises a determining circuit 602 configured to determine the D2D capability of the first radio network node 14 and of the D2D capable radio network node 16,18, respectively.

The determining circuit 602 may be configured to determine the D2D capability based on the received D2D capability information.

The first user equipment 10 may further comprise a requesting circuit 603 configured to request additional first D2D capability information from the first radio network node 14 by transmitting a request message to the first radio network node 14 and by receiving a response message comprising the requested additional D2D capability information.

The request and response message may be a RRC message; a MAC message; or a PLC message.

Embodiments herein for handling of D2D communications may be implemented through one or more processors, such as a processing circuit 608 in the user equipment depicted in FIG. 6, together with computer program code for performing the functions and/or method actions of embodiments herein.

The user equipment 10 may further comprise a memory 609. The memory may comprise one or more memory units and may be used to store for example data such as D2D capability information.

Figure 7:
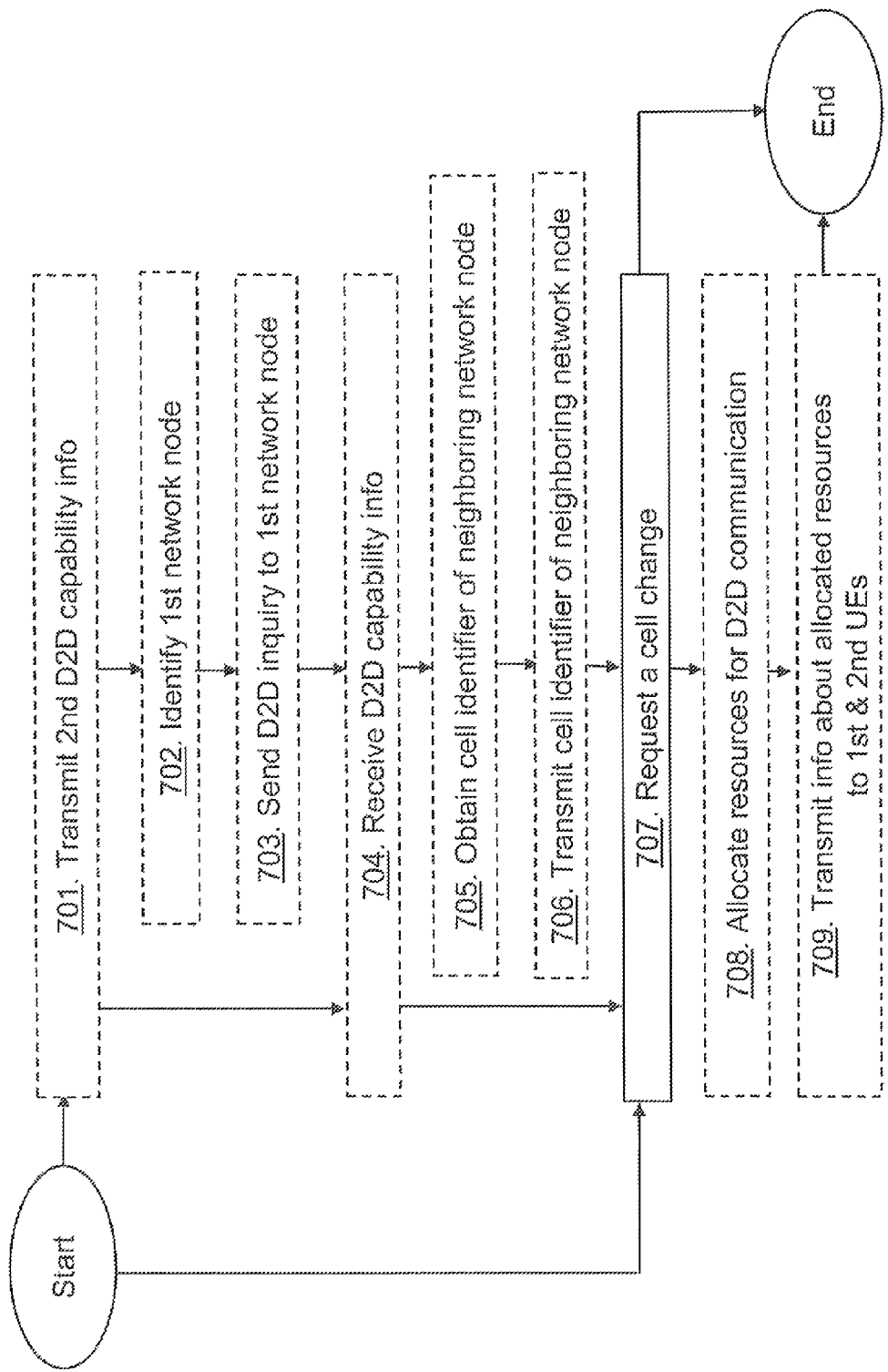
FIG. 7 is a flowchart depicting embodiments of a method in a network node.

FIG. 7 is a schematic flowchart of embodiments of a method in a second network node 16 for enabling D2D communications in the communications network 1. As previously mentioned, the communications network 1 comprises the first user equipment 10 served by the first radio network node 14, the second user equipment 12 and the D2D capable radio network node 16,18. The actions do not have to be performed in the order stated below, but may be taken in any suitable order. Further, actions may be combined.

Action 701. The second network node 16 may transmit D2D capability information to the second user equipment 12. The D2D capability information may relate to the capability of the second network node 16 and is sometimes referred to as second D2D capability information. The D2D capability information may further relate to the D2D capability of a neighbouring network node 18.

Action 702. The second network node 16 may identify the first radio network node 14 that serves the first user equipment 10 by analyzing an uplink packet sent from the second user equipment 12 to the first user equipment 10.

In some embodiments, the second network node 16 uses suitable techniques to detect that the uplink packets sent by second user equipment 12 are destined to the first user equipment 10 that is currently served by the first network node 12.

Examples of suitable techniques are techniques wherein the second network node 16 maintains a table of the neighbouring user equipments that are served by the neighbour network nodes of the second network node. The table of the neighbour user equipments maintained by the second network node may comprise the IP address of the first user equipment and the IP address and other associated identifiers such as Cell-ID, PCI and CGI of the first network node serving the first user equipment. The second network node 16 analyzes the destination address of the uplink packet sent by the second user equipment 12 and can match the said destination address with the IP address of the first user equipment stored in the said table.

In some embodiments, the second network node 16 uses suitable techniques to determine the Cell-ID, e.g. PCI or CGI, of the first network node 14. Examples of suitable techniques are techniques wherein the second network node interrogates the table of the neighbouring user equipments and associates the IP address of the first network node with the Cell-ID, PCI or CGI of the first network node.

In some embodiments, the transmitted signals from the first user equipment in uplink on at least a certain channel, e.g. data channel, are encoded with its serving cell-ID i.e. with its PCI. Hence, the second network node 16 may perform the uplink radio measurement by correlating the transmitted signals in uplink by the first user equipment 10 with the set of PCIs which are likely to be used by the first network node 14, if this is known to the second network node 16.

In some other embodiments, the second network node 16 may perform correlation of the transmitted signals in uplink by the first user equipment 10 by using all possible PCI values i.e. all possible 504 PCI values in LTE or all possible 510 PCI values in WCDMA. The PCI corresponding to the higher correlation peak may be assumed to be the cell-ID of the first network node 14. The second network node 16 may obtain such results (that is high correlation value when correlating the transmitted signal with the PCI values) from the second user equipment 12 at several time instances for the purpose of verification.

At this point the second network node 16 may determine the D2D capability of the first network node 14 by sending it a D2D capability inquiry messages via the second network node—first network node X2 communication interface.

Legacy network nodes are not capable of interpreting the D2D capability inquiry message and do not respond to the D2D capability inquiry message sent by the second network node 16. Thus, if the second network node 16 sends a D2D capability inquiry message to the first network node 14, the second network node 16 will only receive a response from the first network node 14 if the first network node 14 is D2D capable.

However, D2D capable network nodes respond to, the D2D capability inquiry message sent by the second network node 16 by sending a D2D capability response message. Therefore, if the second network node 16 sends a D2D capability inquiry message to the D2D capable neighbouring network node 18, the second network node 16 will receive a response from the D2D capable neighbouring network node 18. Thus, the second network node 16 will obtain knowledge of D2D capable network nodes.

Action 703. The second network node 16 may send a D2D Enquiry to the first radio network node 14 to determine the D2D capability of the first radio network node 14.

In some embodiments, the D2D inquiry is sent using the BS-BS interface, e.g. the X2 interface in LTE. Alternatively, the second network node 16 may send the D2D inquiry message to the first network node through the core network using the S1 interface between the first network node and the core network.

In some embodiments, as a response to the D2D inquiry, the second network node 16 receives from the first network node 14 a D2D inquiry response message comprising the D2D capability of the first network node 14.

Action 704. The second network node 16 may receive D2D capability information relating to the D2D capable neighbouring radio network node 18.

In some embodiments, the D2D capability information relating to the D2D capable neighbouring radio network node 18 is received from the neighbouring network node 18. The D2D capability information relating to the D2D capable neighbouring radio network node 18 may be received over an X2 communication interface. However, the D2D capable neighbouring radio network node 18 may be connected to the same core network as the second network node 16, whereby the D2D capability information relating to the D2D capable neighbouring radio network node 18 may be received over the core network.

In some embodiments, the D2D capability information relating to the D2D capable neighbouring radio network node 18 is received from a central network node 20, such as an OSS that has a direct O&M interface to the second network node 16. Another example is a SON node.

Action 706. The second network node 16 may obtain one or more cell identifiers from the one or more neighbouring radio network nodes 18. Examples of a cell identifier are a PCI and a CGI.

In some embodiments, the second network node 16 may obtain the one or more cell identifiers by acquiring the one or more cell identifiers from the one or more neighbouring radio network nodes 18 via communication over an X2 communication interface. However, the second network node 16 may receive the one or more cell identifiers from the central network node 20.

In some embodiments, the second network node 16 may request the second user equipment 12 to read system information of one or more neighbouring radio network nodes 18 to determine whether the one or more neighbouring radio network nodes 18 are D2D capable, or not, and receiving the result from the second user equipment 12.

Action 706. The second network node 16 may transmit the one or more cell identifiers of one or more neighbouring radio network nodes 18 capable of supporting D2D communication, wherein the one or more cell identifiers are transmitted to the second user equipment 12.

Action 707. When the first radio network node 14 has no D2D capability, the second network node 16 requests a cell change of the first user equipment 10 to the D2D capable radio network node 16,18.

The second network node 16 may request the cell change by requesting the first radio network node 14 to execute a cell change of the first user equipment 10 to the D2D capable radio network node 16 serving the second user equipment 12.

In some embodiments, the second network node 16 requests the cell change by requesting the first user equipment 10 to perform the cell change to the D2D capable neighbouring radio network node 18. Such a request may be sent via the first radio network node 14.

In some embodiments, the second network node 16 requests the first network node to perform a cell change by communicating with the first network node 14 over a network node—network node X2 communication interface.

The cell change may be a handover, a connection re-establishment, a cell reselection, a connection release with redirection to another cell, a primary component carrier change or a primary cell change in a multi-carrier system.

It should be understood that the cell change may be triggered by the user equipments detecting each other as candidates for a D2D communication. Alternatively or in addition, the cell change may be triggered by a network rode detecting a user equipment as a candidate for a D2D communication with the user equipment the network node is serving.

Action 708. The second network node 16 may allocate resources for a D2D communication between the second user equipment 12 and the first user equipment 10.

Action 709. The second network node 16 may transmit information about the allocated resources to the second user equipment 12 and to the first user equipment 10.

Figure 8:
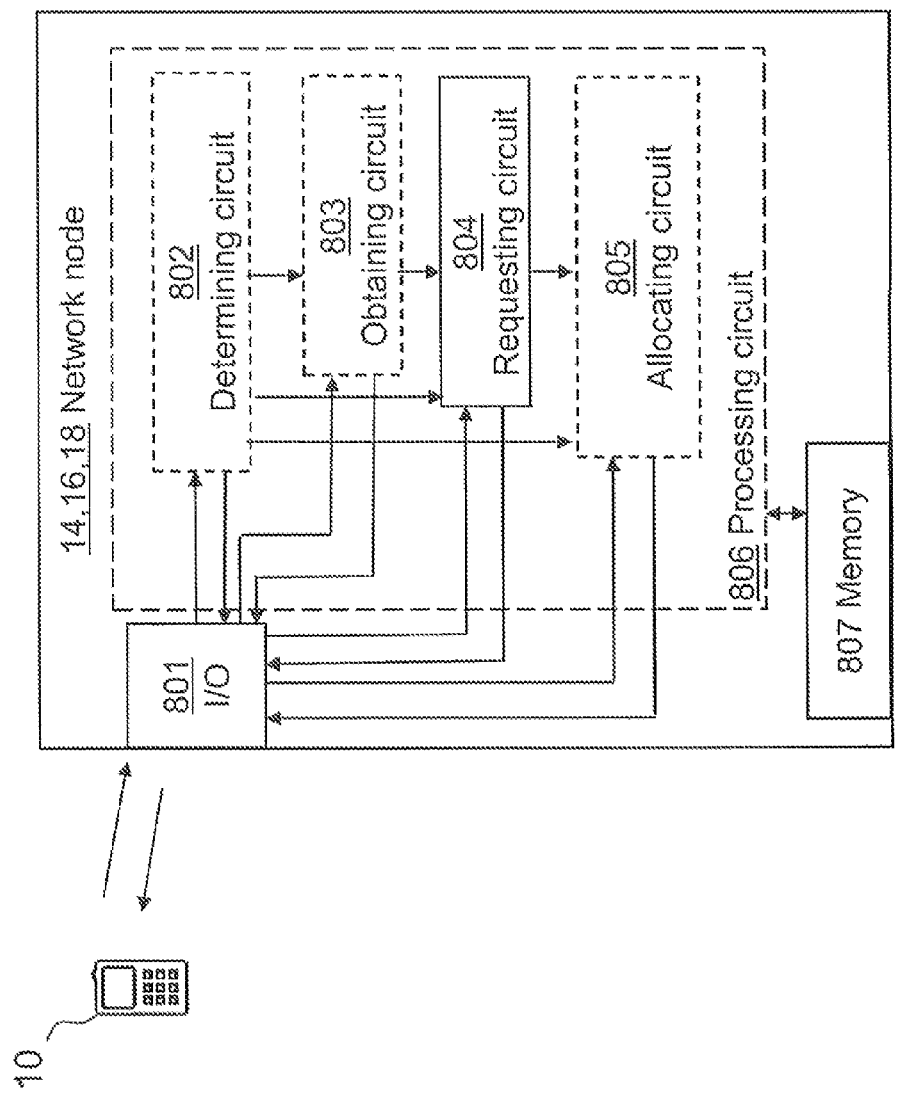
FIG. 8 is a schematic block diagram illustrating embodiments of a network node.

To perform the method actions in the second network node 16 described above for enabling D2D communications in the communications network 1, the second network node 16 comprises the following arrangement depicted in FIG. 8. As previously mentioned, the communications network 1 comprises the first user equipment 10, the first radio network node 14 serving the first user equipment 10, the second user equipment 12, and the D2D capable radio network node 16,18.

The second radio network node 16 comprises a requesting circuit 804 configured to request a cell change of the first user equipment 10 to a D2D capable radio network node 16,18, when the first radio network node 14 has no D2D capability.

The requesting circuit 804 may be configured to request the first radio network node 14 to execute a cell change of the first user equipment 10 to the D2D capable radio network node 16 serving the second user equipment 12.

In some embodiments, the requesting circuit 804 is configured to request, via the first radio network node 14, the first user equipment 10 to perform a cell change to a D2D capable neighbouring radio network node 18.

As previously mentioned, the cell change may be a handover, a connection re-establishment, or a cell reselection, a connection release with redirection to another cell, a primary component carrier change or a primary cell change in a multi-carrier system.

It should be understood that the cell change may be triggered by the user equipments detecting each other as candidates for a D2D communication. Alternatively or in addition, the cell change may be triggered by a network node detecting a user equipment as a candidate for a D2D communication with the user equipment the network node is serving.

The second radio network node 16 may further comprise an allocating circuit 806 configured to allocate resources for a D2D communication between the second us equipment 12 and the first user equipment 10.

In some embodiments, the second radio network node 16 comprises a receiving and transmitting circuit 801 configured to transmit information about the allocated resources to the second use equipment 12 and to the first user equipment 10.

The receiving and transmitting circuit 801 may further be configured to receive D2D capability information relating to the D2D capable neighbouring radio network node 18.

In some embodiments, the receiving and transmitting circuit 801 may further be configured to transmit one or more cell identifiers of one or more neighbouring radio network nodes 18 capable of supporting D2D communication, wherein the one or more cell identifiers are transmitted to the second user equipment 12.

In embodiments, the receiving and transmitting circuit 801 is arranged as a receiving port and a transmitting port.

The second radio network node 16 may further comprise an obtaining circuit 803 configured to obtain one or more cell identifiers from the one or more neighbouring radio network nodes 18.

The obtaining circuit 803 may be configured to acquire the one or more cell identifiers from the one or more neighbouring radio network nodes 18 via communication over an X2 communication interface.

The obtaining circuit 803 may further be configured to receive the one or more cell identifiers from a central network node 20.

In some embodiments, the obtaining circuit 803 is configured to request the second user equipment 12 to read system information of one or more neighbouring radio network nodes 18 to determine whether the one or more neighbouring radio network nodes 18 are D2D capable or not, and to receive the result from the second user equipment 12.

The second radio network node 16 may further comprise a determining circuit 802 configured to identify the first radio network node 14 that serves the first user equipment 10 by analyzing an uplink packet sent from the second user equipment 12 to the first user equipment 10, and to send a D2D inquiry to the first radio network node 14 to determine the D2D capability of the first radio network node 14.

Embodiments herein for enabling DD communications may be implemented through one or more processors, such as a processing circuit 806 in the user equipment depicted in FIG. 8, together with computer program code for performing the functions and/or method actions of embodiments herein.

The second radio network node 16 may further comprise a memory 807. The memory may comprise one or more memory units and may be used to store for example data such as D2D capability information.

When using the word comprise or comprising it shall be interpreted as limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a first user equipment for handling device-to-device, D2D, communications in a communications network, wherein the communications network comprises a first user equipment, a first radio network node serving the first user equipment, a second user equipment, and a D2D capable radio network node, wherein the method comprises:
   recognizing a second user equipment to have a D2D communication with;
   transmitting first D2D capability information associated with the first radio network node serving the first user equipment to the second user equipment;
   receiving second D2D capability information associated with the D2D capable radio network node and a request from the second user equipment to change from the first radio network node to the D2D capable radio network node; and
   performing a cell change from the first radio network node to the D2D capable radio network node, when the first radio network node does not have D2D capability.

2. The method according to claim 1, further comprising establishing a D2D communication between the first user equipment and the second user equipment, when the second user equipment is served by the D2D capable radio network node.

3. The method according to claim 1, further comprising:
   receiving Han the first D2D capability information from the first radio network node, which first D2D capability information relates to the D2D capability of the first radio network node;
   determining the D2D capability of the first radio network node and of the D2D capable radio network node, respectively.

4. The method according to claim 3, wherein receiving the first D2D capability information or the second D2D capability information comprises at least one of:
   acquiring a message containing the D2D capability information, which message is received on a control channel;
   acquiring an indicator representing the D2D capability, which indicator is received on a control channel; and/or
   acquiring a radio network node identifier, which identifier belongs to a pre-determined list of identifiers used for D2D capability radio network nodes.

5. The method according to any of claim 1, wherein performing a cell change comprises autonomously performing a cell change from the first radio network node to the D2D capable radio network node.

6. The method according to claim 1, wherein the radio network node measurement comprises a base station transmit power, a UL and/or DL resource block usage, and/or a cell, and wherein the load indication comprises a hardware load, a transport network load, a radio resource load, an interference load, and/or a traffic load.

7. A method in a second radio network node for enabling D2D communications in a communications network, wherein the communications network comprises a first user equipment served by a first radio network node, a second user equipment and a D2D capable radio network node, wherein the method comprises, when the first radio network node has no D2D capability:
   requesting a cell change of the first user equipment to the D2D capable radio network node; and
   transmitting one or more cell identifiers of one or more neighbouring radio network nodes capable of supporting D2D communication, wherein the one or more cell identifiers are transmitted to the second user equipment.

8. The method according to claim 7, further comprising:
   allocating resources for a D2D communication between the second user equipment and the first user equipment, and
   transmitting information about the allocated resources to the second user equipment and to the first user equipment.

9. The method according to claim 7, wherein requesting a cell change comprises requesting the first radio network node to execute a cell change of the first user equipment to the D2D capable radio network node serving the second user equipment.

10. The method according to claim 7, wherein requesting a cell change comprises requesting, via the first radio network node, the first user equipment to perform a cell change to the D2D capable neighbouring radio network node.

11. The method according to any of claim 7, further comprising identifying the first radio network node that serves the first user equipment by analyzing an uplink packet sent from the second user equipment to the first user equipment, and sending a D2D inquiry to the first radio network node to determine the D2D capability of the first radio network node.

12. A first user equipment for handling device-to-device, D2D, communications in a communications network, wherein the communications network comprises a first user equipment, a first radio network node serving the first user equipment, a second user equipment, and a D2D capable radio network node, wherein the first user equipment comprises:
   a recognizing circuit configured to recognize a second user equipment to have a D2D communication with; and
   a transmitting circuit configured to transmit first D2D capability information associated with the first radio network node serving the first user equipment to the second user equipment;
   a receiving port configured to receive second D2D capability information associated with the D2D capable radio network node;
   a performing circuit configured to perform a cell change from the first radio network node to the D2D capable radio network node, when the first radio network node does not have D2D capability.

13. The first user equipment according to claim 12, further comprising an establishing circuit configured to establish a D2D communication between the first user equipment and the second user equipment, when the second user equipment is served by the D2D capable radio network node.

14. The first user equipment according to claim 12, wherein:
   the receiving port configured to receive the first D2D capability information from the first radio network node, which first D2D capability information relates to the D2D capability of the first radio network node, and to receive a second D2D capability information relating to the D2D capable radio network node; and
   the first user equipment further comprises a determining circuit configured to determine the D2D capability of the first radio network node and of the D2D capable radio network node, respectively.

15. The first user equipment according to claim 14, wherein the receiving port is configured to:
   acquire a message containing the D2D capability information, which message is received on a control channel; and/or acquire an indicator representing the D2D capability, which indicator is received on a control channel; and/or
acquire a radio network node identifier, which identifier belongs to a pre-determined list of identifiers used for D2D capability radio network nodes.

16. The first user equipment according to of claim 12, wherein the performing circuit is configured to autonomously perform a cell change from the first radio network node to the D2D capable radio network node.

17. A second radio network node for enabling D2D communications in a communications network, wherein the communications network comprises a first user equipment served by a first radio network node, a second user equipment and a D2D capable radio network node, wherein the second radio network node comprises:
   a requesting circuit configured to request a cell change of the first user equipment to a D2D capable radio network node, when the first radio network node has no D2D capability; and
   transmitting one or more cell identifiers of one or more neighbouring radio network nodes capable of supporting D2D communication, wherein the one or more cell identifiers are transmitted to the second user equipment.

18. The second radio network node according to claim 17, further comprising:
   an allocating circuit configured to allocate resources for a D2D communication between the second user equipment and the first user equipment, and
   a receiving and transmitting circuit configured to transmit information about the allocated resources to the second user equipment and to the first user equipment.

19. The second radio network node according to claim 17, wherein the requesting circuit is configured to request the first radio network node to execute a cell change of the first user equipment to the D2D capable radio network node serving the second user equipment.

20. The second radio network node according to claim 17, wherein the requesting circuit is configured to request, via the first radio network node, the first user equipment to perform a cell change to a D2D capable neighbouring radio network node.

21. The second radio network node according to any of claim 17, further comprising a determining circuit configured to identify the first radio network node that serves the first user equipment by analyzing an uplink packet sent from the second user equipment to the first user equipment, and to send a D2D inquiry to the first radio network node to determine the D2D capability of the first radio network node.

* * * * *